(12) United States Patent
Munson

(10) Patent No.: US 8,161,900 B2
(45) Date of Patent: Apr. 24, 2012

(54) LITTLE REMINDER

(76) Inventor: Jennifer Elsia Munson, Statesville, NC (US)

(*) Notice: Subject to any disclaimer, the term of this patent is extended or adjusted under 35 U.S.C. 154(b) by 281 days.

(21) Appl. No.: 12/691,002

(22) Filed: Jan. 21, 2010

(65) Prior Publication Data

US 2010/0180813 A1    Jul. 22, 2010

Related U.S. Application Data

(60) Provisional application No. 61/146,050, filed on Jan. 21, 2009.

(51) Int. Cl.
  *G08B 5/00* (2006.01)
  *G09F 21/04* (2006.01)
(52) U.S. Cl. ..................... 116/28 R; 116/306
(58) Field of Classification Search ............ 116/1, 28 R, 116/42, 43, 44, 200, 303, 306, 309; 40/591, 40/593, 643, 644
  See application file for complete search history.

(56) References Cited

U.S. PATENT DOCUMENTS

| | | | | |
|---|---|---|---|---|
| 2,817,916 A * | 12/1957 | Allen et al. | ............. | 40/614 |
| 3,237,330 A * | 3/1966 | Dinstbir | ............. | 40/593 |
| 3,310,023 A * | 3/1967 | Linsley | ............. | 116/28 R |
| 4,212,260 A * | 7/1980 | Splan | ............. | 116/28 R |
| 4,236,479 A * | 12/1980 | Walker et al. | ............. | 116/28 R |
| 4,899,683 A * | 2/1990 | Cuffaro | ............. | 116/215 |
| 4,936,244 A * | 6/1990 | Hansen et al. | ............. | 116/28 R |
| 5,046,446 A | 9/1991 | Sumrall et al. | | |
| 5,058,523 A * | 10/1991 | Mikkonen et al. | ............. | 116/28 R |
| 5,235,933 A * | 8/1993 | Pare et al. | ............. | 116/204 |
| 5,451,928 A | 9/1995 | Cody | | |
| 6,282,823 B1 * | 9/2001 | Brown | ............. | 40/593 |
| 6,870,472 B2 | 3/2005 | Gift et al. | | |
| 7,250,869 B2 | 7/2007 | Davis | | |
| 7,726,736 B1 * | 6/2010 | Grago et al. | ............. | 297/250.1 |
| 7,908,777 B1 * | 3/2011 | Beardsley | ............. | 40/320 |
| 7,966,109 B2 * | 6/2011 | Desjardins | ............. | 701/29 |
| 2005/0091892 A1 * | 5/2005 | Dang | ............. | 40/593 |
| 2006/0103525 A1 * | 5/2006 | Alger | ............. | 340/545.8 |
| 2006/0176183 A1 * | 8/2006 | Jetton | ............. | 340/573.1 |
| 2007/0220793 A1 * | 9/2007 | Mappes | ............. | 40/593 |
| 2009/0172982 A1 * | 7/2009 | Bell | ............. | 40/541 |

FOREIGN PATENT DOCUMENTS

NL     1033312 C6 *   8/2008

* cited by examiner

*Primary Examiner* — R. A. Smith
(74) *Attorney, Agent, or Firm* — Ronald L. Hofer

(57) ABSTRACT

A reminder device for an automotive vehicle has a hand pivotally attached to a base which is attached to the driver's side door of the vehicle. The reminder device is positioned in a manner so that the hand pivots outwardly upon opening of said door into a position such that a finger of the hand interferes with closing of the door.

6 Claims, 2 Drawing Sheets

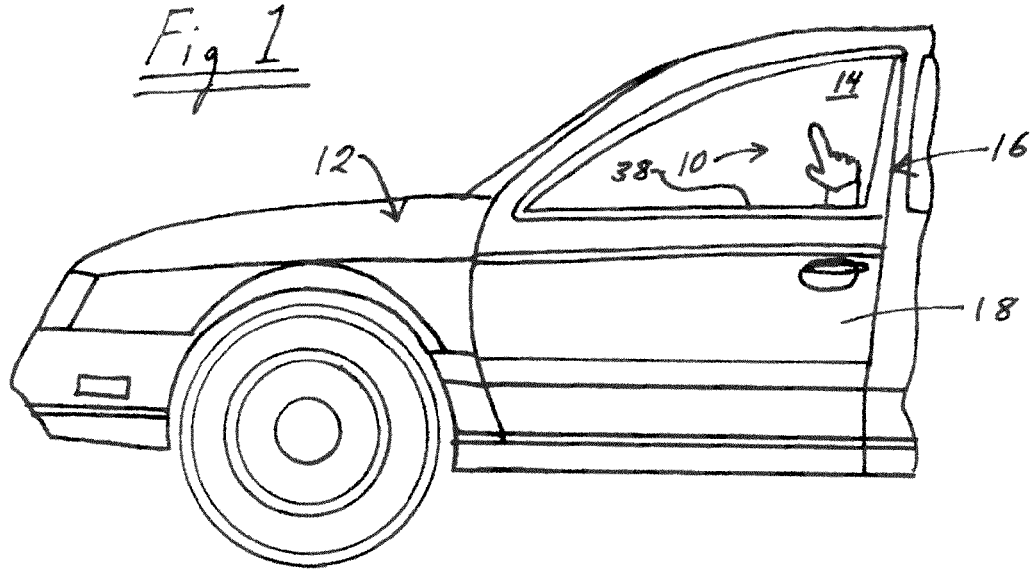
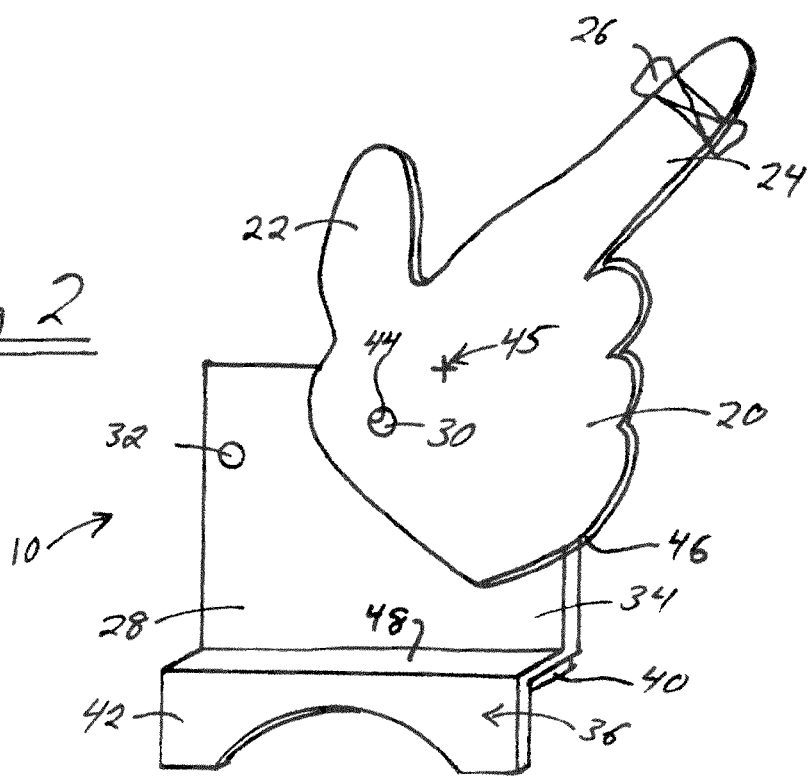

LITTLE REMINDER

BACKGROUND OF THE INVENTION

The present invention relates to a small device for use in an automotive vehicle to remind the driver to think when he or she is exiting the vehicle. More specifically in a preferred embodiment, the present invention relates to a mechanical device which, upon opening of the vehicle door, pivots into a position which blocks the door from closing to remind the driver to confirm that there is no child about to be left behind in the vehicle.

Despite the development of child safety devices which improve the safety of children riding in moving automotive vehicles, such as car seats for children, there remain safety issues relating to children being accidentally left behind in vehicles. There also are similar issues concerning pets being left in automotive vehicles. If left unattended for a length of time in a vehicle, a child may become dehydrated or suffer adverse effects from heat or cold. That this can have disastrous consequences is well publicized and there have been some developmental efforts to prevent the occurrence. For example, a child car seat alert system is disclosed in U.S. Pat. No. 7,250,869, Jul. 31, 2007 to Le'Roychelle Davis and a warning system for detecting presence of a child in an infant seat is disclosed in U.S. Pat. No. 6,870,472, Mar. 22, 2005 to Gift et al. However, it is believed there remains a need for an inexpensive reminder device which can be used to remind a driver to check to make sure a child is not about to be left behind in the vehicle.

While modern society offers many benefits, it also often offers many stresses due to the hectic life many choose to live. It is believed that one of the problems raised by stress is that of forgetting things. Of course, there are devices already known for the purpose of reminding one about something. For example, U.S. Pat. No. 5,451,928, Sep. 19, 1995 discloses an apparatus for the prevention of locking a key in a car and U.S. Pat. No. 5,046,446 discloses a reminder device which is attached to an umbrella. However, it is believed there remains a need for a reminder device to aid in the prevention of accidentally leaving a child behind in a vehicle.

Accordingly, the present invention provides an inexpensive, simple device which can serve as a reminder device when one opens the door of an automotive vehicle. Further understanding of the present invention will be had from the following disclosure taken in conjunction with the accompanying drawings and claims.

SUMMARY OF THE INVENTION

A reminder device in combination with an automotive vehicle having a door, said reminder device comprising a body pivotally attached to a base, said base attached to said door of said vehicle, said device pivotally attached and positioned in a manner to pivot outwardly upon opening of said door into a position wherein part of said device interferes with closing of said door.

BRIEF DESCRIPTION OF THE DRAWINGS

FIG. 1 is a side elevational view, broken away, showing a preferred embodiment of a reminder device of the present invention installed in an automotive vehicle;

FIG. 2 is a perspective view of the reminder device of FIG. 1;

DESCRIPTION OF THE PREFERRED EMBODIMENT

Figure 3:
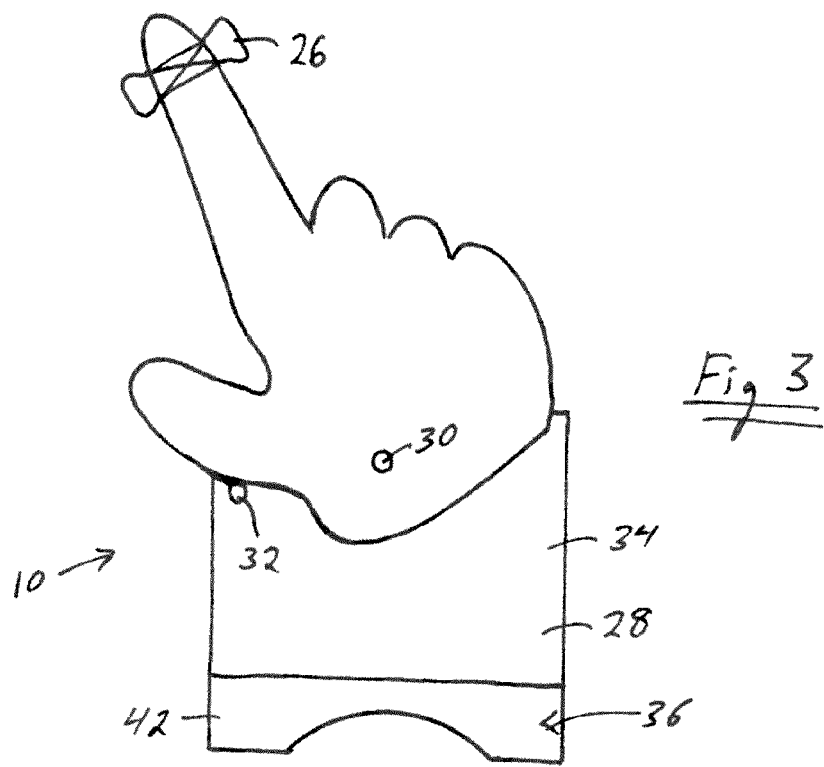
FIG. 3 is a side elevation of the reminder device and vehicle, broken away, of FIG. 1 in its NORMAL position.
Figure 4:
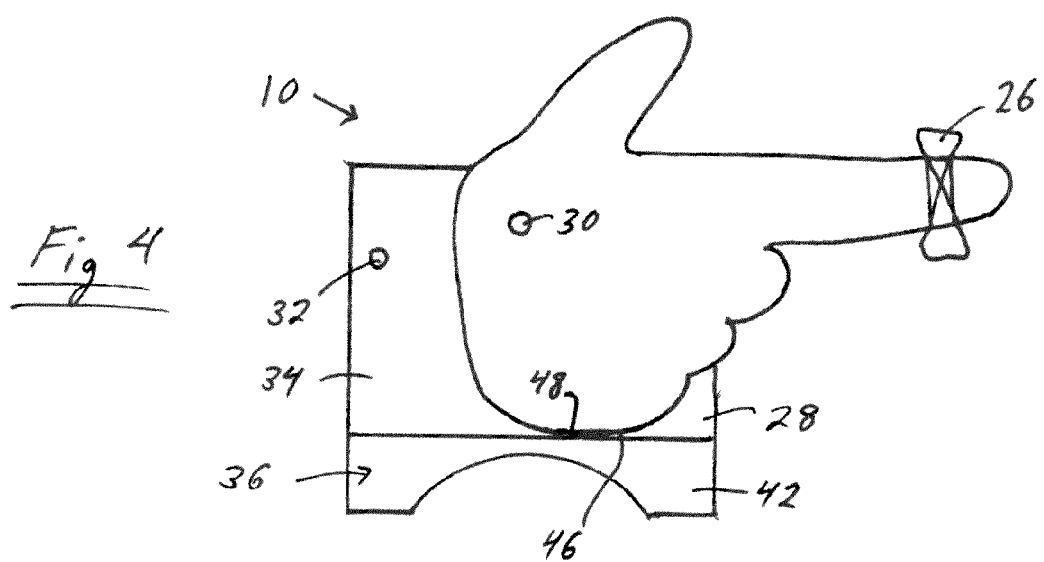
FIG. 4 is a side elevation of the reminder device and vehicle, broken away, of FIG. 1 in its REMINDER position.

Now referring to FIG. 1, a reminder device of the present invention is indicated by the numeral 10 and is shown in operative association with an automotive vehicle 12. As is well illustrated in FIG. 1, reminder device 10 is intended to be attached inside the vehicle proximate to the window 14 at a location proximate to the outside edge 16 of driver's door 18. As will be disclosed in more detail hereinafter, reminder device 10 is adapted to pivot to a door stop position upon the opening of door 18 so that door 18 cannot be closed until the driver manually repositions reminder device 10 to allow closing of door 18.

As best shown in FIG. 2, reminder device 10 has, in side elevation, the general shape of a human hand 20 with thumb 22, and first finger 24, the remaining fingers being shown as in closed position. A decorative reminder such as ribbon 26 is attached to first finger 24 of hand 20 to serve as a reminder hint. Hand 20 is pivotally attached to stand 28 by pivot pin 30. Various designs of pivot pin 30 and the attachment of hand 20 to stand 28 can be used so long as hand 20 is able to freely pivot with respect to stand 28 and the details of such attachment are not shown herein as such details will be readily apparent to those in the art. Stop pin 32 is positioned as shown in FIG. 2 and functions to stop pivotally movement of hand 20 to the left as viewed in the Figures when it is in the rest position. Of course, the exact positioning of stop pin 32 and the amount of rotation of hand 20 is subject to variation and modification so long as the purpose and effect of the pivotal movement of hand 20 are obtained as described herein.

Stand 28 has a generally vertically extending portion 34 with an integral L-shaped base 36 for attachment to upwardly facing surface 38 of door 18. Base 36 can be attached to surface 38 of door 18 by conventional two-sided adhesive tape 40 or other conventional attachment means. Lip 42 of L-shaped base 36 is provided to assist in locating base 36 in position on door 18. The exact attachment means, as well as the size and design of stand 28 may be adjusted to fit the particular door to which it is to be attached so long as stand 28 serves its function as described herein.

Hand 20, stand 28, and pins 30 and 32 can be made of any suitable material such as various thermoplastic materials of all kinds such as acrylic, polyethylene or polypropylene and the like. It is preferable that all or at least part of hand 20 have a bright color, such as a bright florescent color, to help attract the driver's attention. Hence, suitable materials may incorporate a fluorescent or phosphorescent material to further enhance its appearance and/or to call one's attention to even in low light conditions.

In operation of reminder device 10, hand 20 is normally in a rest position, out of the way of interfering with movement of the vehicle door, with thumb 22 of hand 20 resting against stop pin 32 as shown in FIGS. 1 and 3. Pivot pin 30 is loosely located in hole 44 in hand 20 or hand 20 is otherwise allowed to freely pivot with respect to stand 28. Pivot pin 30 and hence the pivotal axis of hand 20 is located below the center of gravity 45 of hand 20 so that upon opening of door 18, centrifugal force will cause the upper part of hand 20, i.e., first finger 24 to swing rightwardly as shown in the figures about pivot pin 30 until the rightward edge 46 of hand 20 comes into contact with upwardly facing surface 48 of stand 28. Door 18 is now open and cannot be closed because finger 24 of hand 20 would interfere with the closing of door 18. It is intended that the driver will note the first finger reminder and think to check whether a child is being left behind before manually pivoting hand 20 leftwardly and out of interference with the closing of door 18. Door 18 can then be closed without causing hand 20 to pivot into an interfering position, the opening of door 18 normally generating more centrifugal work than the closing of door 18. It is believed that an additional advantage of this invention is that it reduces the chances of accidentally closing door 18 on one's own or another's fingers by interposing the step of manually resetting hand 20 and requiring one not to slam the door lest hand 20 pivot to the right.

It will be appreciated by those skilled in the art that the present invention is subject to variation and modification within the broad scope of the present invention. For example, the reminder device can have the hand shape as shown or another shape which serves the same purpose. Also, the device can be made of a variety of materials. Therefore, it is intended that this invention will be limited only by the scope of the following claims.

What is claimed is:

1. A reminder device in combination with an automotive vehicle having a door, said reminder device comprising a body pivotally attached to a base, said base attached to said door of said vehicle, said body pivotally attached and positioned to pivot outwardly upon opening of said door into a position wherein part of said body interferes with closing of said door.

2. The reminder device of claim 1, wherein said body, in side elevation, has in the general shape of a human hand with a first finger extended.

3. The reminder device of claim 2, wherein said body is made of semi-transparent, fluorescent material.

4. The reminder device of claim 3, wherein said body carries an inscription.

5. The reminder device of claim 4, wherein said base is attached to said automotive vehicle with a two-sided adhesive tape.

6. The reminder device of claim 5, wherein said first finger has a ribbon attached thereto.

\* \* \* \* \*